US006747275B2

(12) United States Patent
Raper et al.

(10) Patent No.: US 6,747,275 B2
(45) Date of Patent: Jun. 8, 2004

(54) MOTION SENSING SYSTEM HAVING SHORT RANGE CAPABILITY

(75) Inventors: William C. Raper, Bowling Green, KY (US); Kim I. McCavit, Saint Joseph, MI (US); Yiu Ming Tsui, Tuen Mun (HK)

(73) Assignee: Desa IP, LLC, Miami, FL (US)

( * ) Notice: Subject to any disclaimer, the term of this patent is extended or adjusted under 35 U.S.C. 154(b) by 258 days.

(21) Appl. No.: 09/999,052

(22) Filed: Nov. 1, 2001

(65) Prior Publication Data

US 2003/0080296 A1 May 1, 2003

(51) Int. Cl.[7] .................................................. G01J 5/02
(52) U.S. Cl. .................................... 250/342; 250/338.1
(58) Field of Search ............................. 250/338.1, 342, 250/353, 339.14

(56) References Cited

U.S. PATENT DOCUMENTS

| | | | | |
|---|---|---|---|---|
| 5,282,118 A | | 1/1994 | Lee | |
| 5,381,009 A | * | 1/1995 | Brownell | 250/342 |
| 5,434,764 A | | 7/1995 | Lee et al. | |
| 5,590,953 A | | 1/1997 | Haslam | |
| 5,598,066 A | | 1/1997 | Wiesemann et al. | |
| 5,757,004 A | | 5/1998 | Sandell et al. | |
| 6,323,488 B1 | | 11/2001 | McCavit et al. | |
| 6,348,691 B1 | * | 2/2002 | Sandell | 250/353 |

OTHER PUBLICATIONS

DESA International, Inc.; Heath /Zenith Motion Sensor LIght Control Operation Manual for Model SL–5105; Dec. 2000; pp. 1–4 (English Version); Volumn 598–1102–01; DESA International, Inc.; USA.

DESA International, Inc.; Heath /Zenith section of product catalog that features Decorative Motion for Cast Aluminum; Dec. 1998; pp. 6–7; DESA International, Inc.; USA.

DESA International, Inc.; Heath /Zenith section of product catalog that features Decorative Motion for Solid Brass; Dec. 1998; pp. 8–9; DESA International, Inc.; USA.

DESA International, Inc.; Heath /Zenith section of product catalog that features Motion Sensing: Dec. 1998; p. 10; DESA International, Inc.; USA.

DESA International, Inc.; Heath /Zenith section of product catalog that features Motion Sensing for Security Lights and for Quartz Halogen Lights; Dec. 1998; p. 11; DESA International, Inc.; USA.

* cited by examiner

*Primary Examiner*—Constantine Hannaher
*Assistant Examiner*—Timothy Moran
(74) *Attorney, Agent, or Firm*—John F. Salazar; Middleton Reutlinger

(57) ABSTRACT

A motion sensing system is disclosed having a housing or mounting, a sensor, a shield and a cover. A spacer and a printed circuit board may also be included. The cylindrical shaped sensor is placed within the cup shaped shield with the spacer disposed between the sensor and the printed circuit board. The shield and the printed circuit board are then fastened together. Next, the bottom or nose of the mounting shield is placed into the dish shaped cover and the combination is fastened to the housing with the cover extending into an opening in the bottom wall of the housing. The system allows a downward looking motion sensing capability in addition to the typical forward sensing capability which may also be installed in the housing. The housing may then be connected to a security lighting fixture. An even simpler version is a motion sensing system having a simple mounting for a two transducer PIR sensor where one of the transducers is covered and a Fresnel lens is absent. An effective short range motion detector results and the sensor may be aimed in any direction.

22 Claims, 5 Drawing Sheets

72
76
70
66
74
78
92

66
70
100
94
102
92

97
60
98
99
96

66
96
100
94
60
98
101
99

MOTION SENSING SYSTEM HAVING SHORT RANGE CAPABILITY

BACKGROUND OF THE INVENTION

1. Field of the Invention

The present invention relates to a motion sensing system and more particularly to a motion sensing system having short range capability for downward or outward looking, which system is simple, reliable and inexpensive.

2. Description of the Related Art

Motion sensing systems using passive infrared (PIR) sensors are well known. For example, such motion sensing systems are incorporated into light fixtures as a security feature and as an energy saving device. Examples of consumer type light fixtures having motion sensing systems may be found in U.S. Pat. Nos. 5,282,118; 5,434,764; 5,590,953; 5,598,966; 5,757,004; and 6,323,488.

Some of these patents concern movable motion sensing systems to compensate for uneven ground levels around an installed system or close placement of a sensing system to a heavily traveled street. These compensate when the system must be installed at higher than usual elevations or where ordinary street traffic interferes with the typical range of a system.

A common problem remains, however, in the region or space below an installed system. The typical forward looking motion sensing system, one having a line of sight outwardly away from a building, does not detect movement under the sensor. Often this non-monitored space is along the wall to which the system is attached. From a security standpoint, not being able to sense motion in the region along a wall is unacceptable.

BRIEF SUMMARY OF THE INVENTION

The difficulties encountered in the past have been overcome by the present invention. What is described here is a motion sensing system placed so as to have a downward looking capability comprising a housing having an opening allowing a view in a downward direction when the housing is mounted for use, a sensor positioned in the housing, and a shield for mounting the sensor and for shielding the sensor from weather effects. In a simplified version the system includes a mounting, a PIR sensor having two side by side transducers and a blocking element to cover one of the two transducers from receiving infrared energy. Moreover, there is an absence of a Fresnel lens.

There are a number of advantages, features and objects achieved with the present invention which are believed not to be available in earlier related devices. For example, one advantage of the present invention is that the motion sensing system has a downward looking detection capability which is inexpensive, simple and reliable. Another object of the present invention is to provide a motion sensing system which uses a single mounting element for the look down feature. Yet another feature of the present invention is that the motion sensing system has a downward looking capability which uses a single mounting element that also provides a weather barrier around the sensor. A further advantage of the present invention is to provide the motion sensing system with a downward or outward looking capability which is structurally effective and cost efficient by using a readily available and relatively low cost two-transducer sensor where one of the sensor's transducers is blocked. Still another feature of the present invention is to provide a motion sensing system for short range that requires no Fresnel lens.

A more complete understanding of the present invention and other objects, advantages and features thereof will be gained from a consideration of the following description of a preferred embodiment read in conjunction with the accompanying drawing provided herein. The preferred embodiment represents an example of the invention which is described here in compliance with Title 35 U.S.C. § 112.

DETAILED DESCRIPTION OF A PREFERRED EMBODIMENTS OF THE INVENTION

Figure 1:
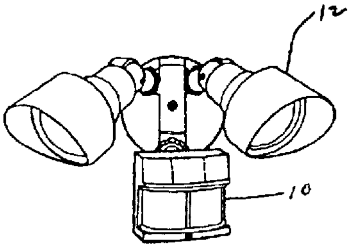
FIG. 1 is an isometric view of a motion sensing system incorporated into a security lighting fixture.

While the present invention is open to various modifications and alternative constructions, the preferred embodiments shown in the drawing will be described herein in detail. It is understood, however, that there is no intention to limit the invention to the particular forms or examples disclosed. On the contrary, the intention is to cover all modifications, equivalent structures and methods, and alternative constructions falling within the spirit and scope of the invention as expressed in the appended claims, pursuant to Title 35 U.S.C. § 112 ($2^{nd}$ paragraph).

Figure 2:
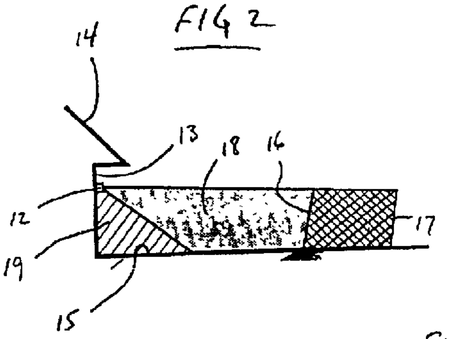
FIG. 2 is a diagrammatic elevation view of the extent of coverage about a building on which a motion sensing system is mounted where the system is forward or outward looking.
Figure 3:
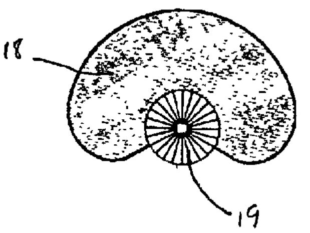
FIG. 3 is a diagrammatic plan view of the extent of coverage of a forward looking motion sensing system.

Referring now to FIGS. 1, 2 and 3, there is illustrated a motion sensing system 10 as part of a security lighting system 12. Such a system typically is mounted for use on a vertical wall 13 of a house, garage or barn 14 at some convenient height, typically 6–20 feet above ground level 15, depending upon the range of the incorporated sensor. Generally, the range for a forward looking or forward line of sight motion sensing system extends approximately 70 feet as indicated by the line 16, though when boosted, sensing may extend to approximately 100 feet as indicated by the line 17. The region or zone 18, FIG. 2, within sensing range is either shaded or covered by cross-hatched lines in the Figures. In a two sensor forward looking system, coverage may extend approximately 240 degrees as indicated by the shaded region 18 in FIG. 3. A problem, however, exists in the region designated 19, FIGS. 2 and 3, which is generally beneath the motion sensing system and is typically along the wall 13 to which the lighting/motion sensing system is mounted. The region 19 is generally not within the coverage of a forward looking, consumer type, motion sensing system.

Figure 7:
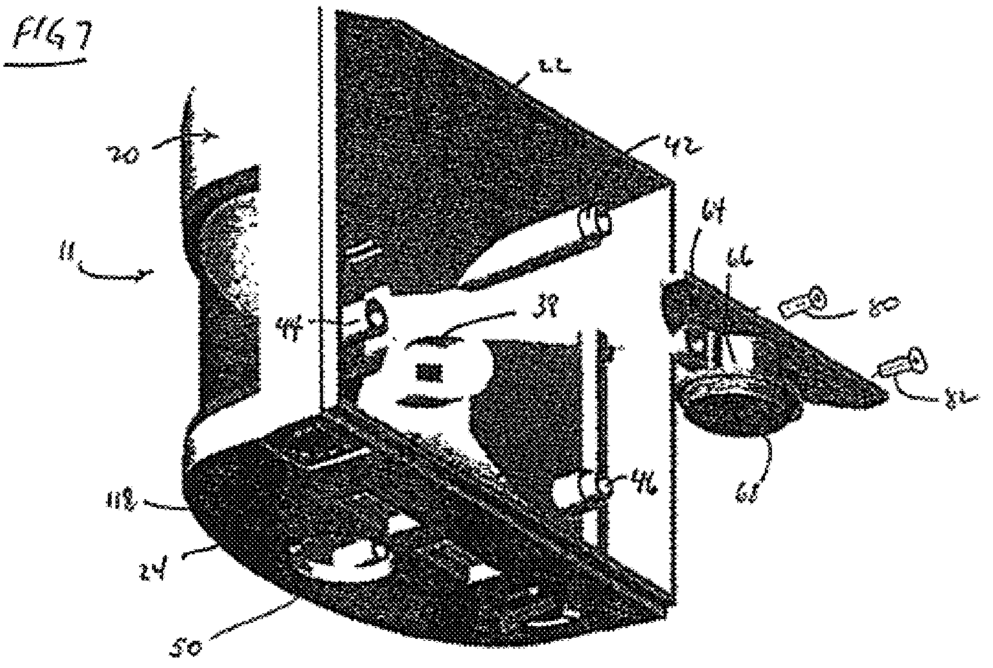
FIG. 7 is an enlarged rear upward isometric view, partly exploded, of the housing and other elements of a motion sensing system.
Figure 8:
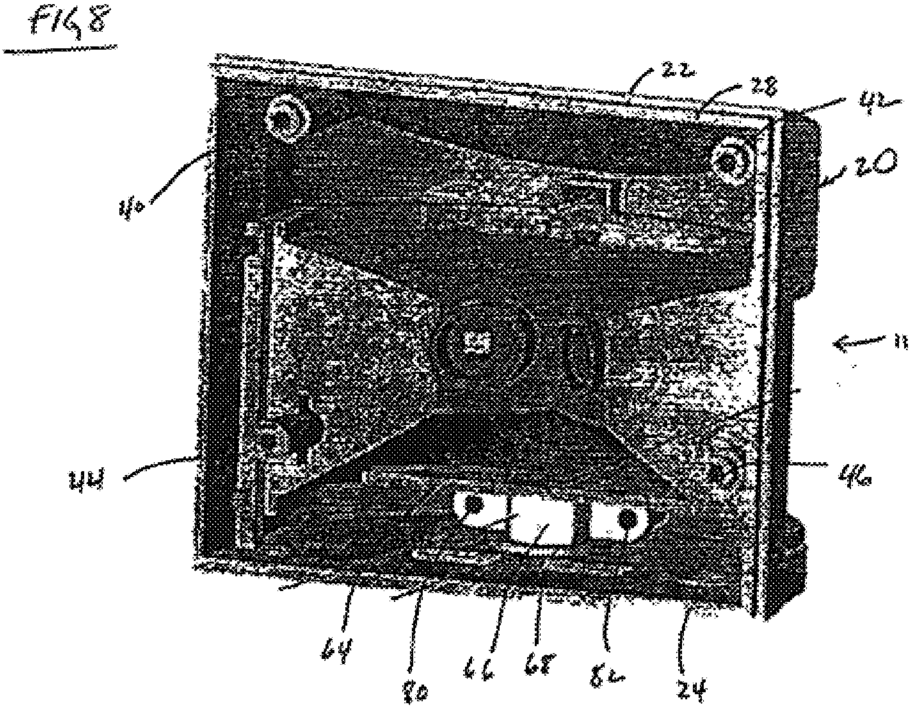
FIG. 8 is a rear isometric view illustrating the downward looking motion sensing system shown in FIG. 7.

The motion sensing system 11, FIGS. 7 and 8, disclosed here provides a short range downward looking capability which is inexpensive, simple and reliable and thus well suited for the consumer market. As explained below, short range motion sensing may have other uses as well. For purposes of this description, a motion sensing system is described as part of a consumer lighting fixture including forward looking motion sensing devices or systems in addition to the downward looking motion sensing system. The motion sensing system may also be used for short range forward looking motion detection. Such a system is inexpensive, simple and reliable.

Figure 4:
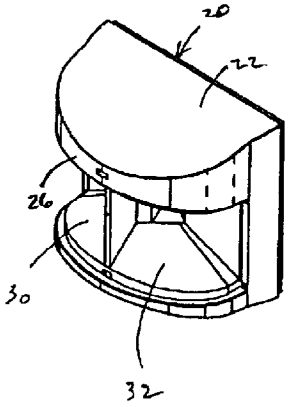
FIG. 4 is a front downward looking isometric view of a motion sensing system housing.
Figure 5:
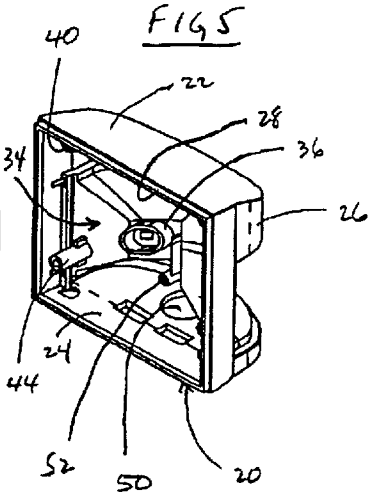
FIG. 5 is a rear downward isometric view of the housing shown in FIG. 4.
Figure 6:
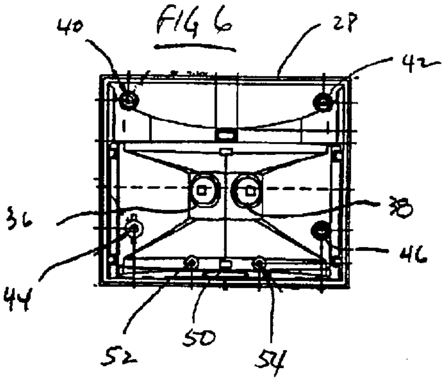
FIG. 6 is a rear elevation view of the housing shown in FIGS. 4 and 5.

Referring now to FIGS. 4–6, there is illustrated a housing 20 for mounting the motion sensing components for both forward and downward looking motion detection. The housing includes a top wall 22, a bottom wall 24, a curved front wall 26 and a rear border 28. The housing is divided into two front interior regions 30, 32, one for each forward looking sensor, and a rear interior region 34. Within the rear interior region 34 are two sensor pods 36, 38 which are formed to receive two PIR sensors (not shown) that are provided to allow forward looking motion sensing. The two front interior regions 30, 32 are typically covered by Fresnel lenses (not shown) while the rear border 28 is typically engaged by a rear panel (not shown) that covers the interior region 34.

Also located within the rear interior region 34 are attachment elements, such as an upper pair of attachment sleeves 40, 42 and a lower pair of attachment sleeves 44, 46. Each of the sleeves has a threaded opening for receiving a threaded fastener, such as a screw. By altering an existing motion sensing housing, it may be used to also inexpensively sense motion below the housing. In the bottom wall 24 is an opening 50 that allows a view or line of sight in a downward direction when the housing is mounted for use and which is part of the motion sensing system as will be explained hereinbelow. Adjacent the opening 50 and the bottom wall are two smaller attachment elements in the form of two sleeves 52, 54 which have threaded openings for the purpose of receiving threaded fasteners, such as screws. The larger attachment sleeves 40, 42, 44, 46 facilitate mounting of a circuit board (not shown) for the forward looking sensors and connection of the rear panel. The smaller sleeves 52, 54 are used to connect elements of the downward looking motion sensing system in a simple yet elegant manner. The housing may be made of any suitable material, such as Noryl or Lexan, allowing it to be molded as an integral piece.

Another advantage of the motion sensing system disclosed is that a single mounting element is used to connect the various internal elements of the system together, and at the same time, the mounting element provides a weather barrier around the downward looking PIR sensor. Furthermore, the mounting element also covers one of the sensor's internal transducers so that sensitivity of the sensor is improved by eliminating the sensor's inherent canceling effect. Also, in short range applications, the coverage of the transducer eliminates the need for a Fresnel lens.

Figure 9:
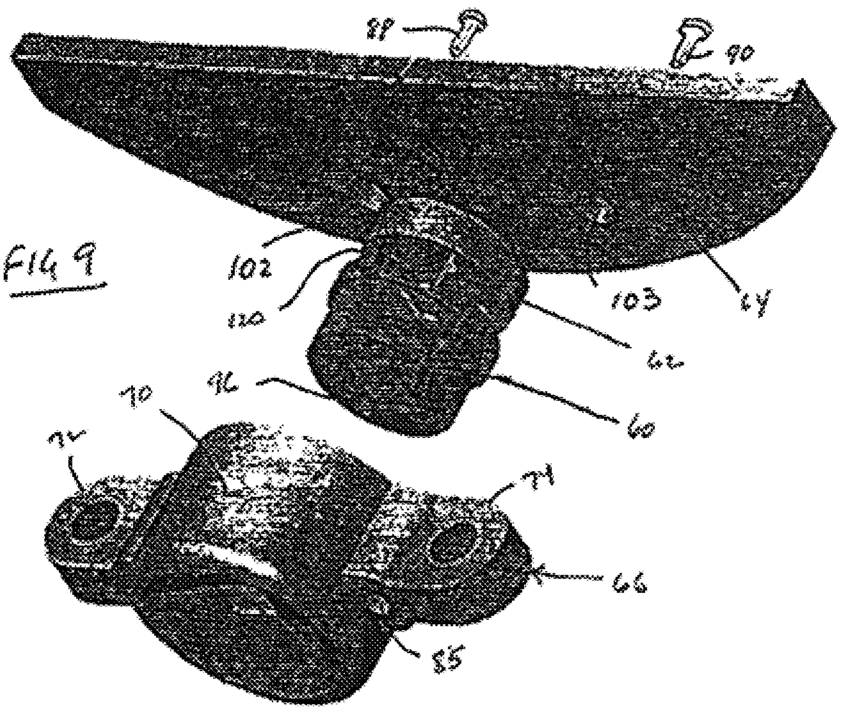
FIG. 9 is an exploded isometric view of a PIR sensor, a spacer, a printed circuit board and a weather shield.
Figure 10:
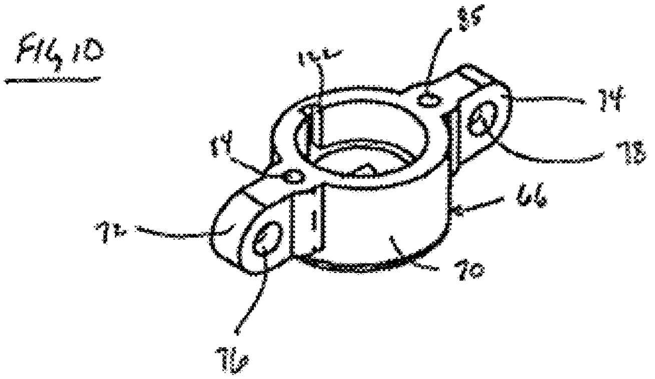
FIG. 10 is a downward looking isometric view of the weather shield.
Figure 11:
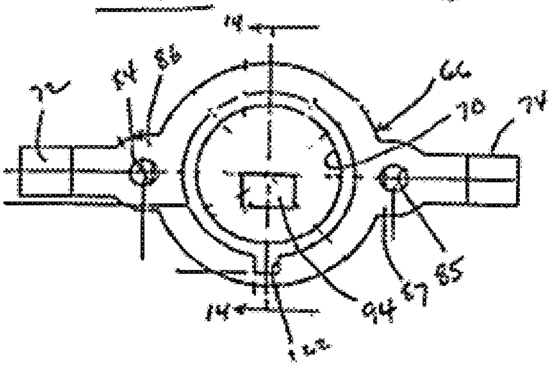
FIG. 11 is a top plan view of the weather shield.
Figure 12:
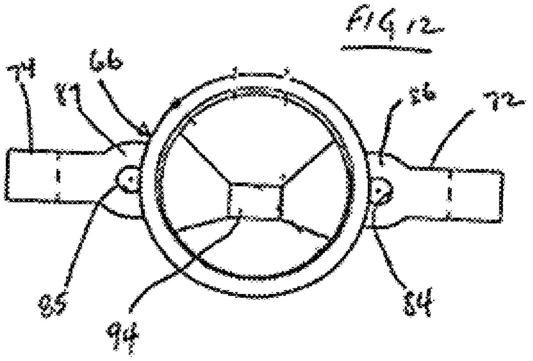
FIG. 12 is a bottom plan view of the weather shield.
Figure 13:
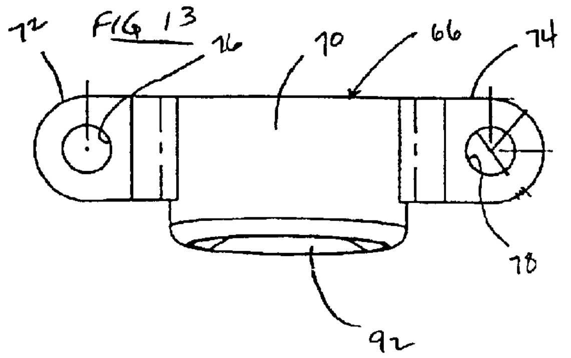
FIG. 13 is an elevation view of the weather shield.
Figure 14:
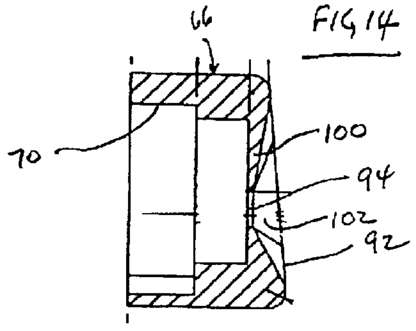
FIG. 14 is a section view taken along lines 14—14 of FIG. 11.

Referring now to FIGS. 7, 8 and 9, the downward looking motion sensing components are shown partially assembled in FIG. 7 and more fully assembled in FIG. 8. In addition to the housing 20, the motion sensing system 11 will generally include a PIR sensor 60, a spacer 62, a printed circuit board 64 (PC board), a mounting element or weather shield 66, a cover 68 and corresponding fasteners. The printed circuit board may contain a circuit for receiving signals from the sensor. The circuit will be explained below. It is to be understood that the PC board may be positioned elsewhere than as shown and that wires may be used to connect the circuitry to the sensor. When the sensor, the spacer, the PC board, the weather shield and the cover are brought together and installed as shown in FIG. 8, a very compact, simple and reliable arrangement is the result. This arrangement, when combined with a forward looking motion sensing system, allows security coverage of all of the regions or zones shown in FIGS. 2 and 3, including the region 19. To complete a motion sensing system having both forward and downward capabilities, two forward looking sensors are located in the pods 36, 38, and are attached to an appropriate circuit typically on a printed circuit board. A rear panel is secured and a source of electrical energy is connected. The result is a security lighting system which operates whenever motion is sensed within the regions 18 or 19, FIGS. 2 and 3.

Referring now to FIGS. 10–14, the simple elegance of the weather shield 66 is shown in greater detail. The shield includes a central, cup-shaped portion 70 with integral opposing ears 72, 74. Each of the ears is an attachment element and each includes an opening, a first opening 76 in the left ear 72 and a second opening 78 in the right ear 74. This pair of openings 76, 78 receive a pair of fasteners, such as the screws 80, 82 shown in FIGS. 7 and 8. The shield 66 also includes another attachment element in the form of a second pair of openings 84, 85 at the roots 86, 87 of the ears. These also receive a pair of screws, such as the screws 88, 90 illustrated in FIG. 9. The screws 80, 82 fasten the shield to the housing 20 and the screws 88, 90 fasten the shield to the PC board 64. As can be seen, the two pairs of openings, the first pair 76, 78 and the second pair 84, 86 are disposed generally perpendicular to one another as shown in FIGS. 9–13.

Figure 15:
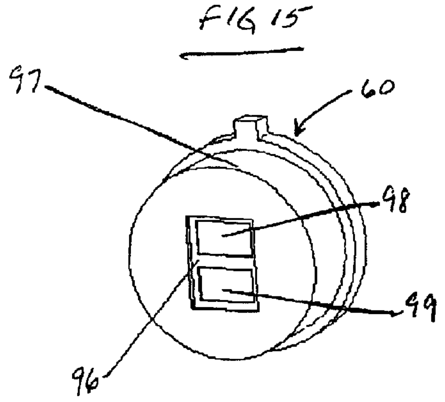
FIG. 15 is an isometric view of a two transducer PIR sensor.

The shield also includes a nose portion 92 having a small, recessed, rectangular opening 94. The opening is specially shaped to cover one-half of the sensor window 96, FIG. 9, of the sensor 60. The type of motion detector used in consumer products uses infrared energy radiated from a moving target to sense motion. A typical PIR detector is shown in FIG. 15. A metal housing 97 with the infrared (IR) transparent window 96 encloses two IR transducers 98, 99 that are capable of converting infrared energy into electrical energy or signals. These small electrical signals are amplified and processed by external circuitry, usually on a nearby PC board, in order to detect the motion of warm objects. The PIR detector and external circuit used for this signal processing are well known to those familiar with the art.

Commonly available PIR detectors use two internal IR transducers. PIR detectors are available with single IR transducers or with more than two IR transducers, but they are not produced in high volumes and are generally too expensive for use in a typical consumer product. Dual transducer PIR detectors arrange the two IR transducers in side by side relationship and the signals they generate are opposite in polarity. Each IR transducer will generate a small signal if both are sensing the same infrared energy, but because the IR transducers have opposite polarities, the signals will cancel and motion may not be detected. This cancellation is intended because it allows the PIR detector to adjust to varying weather conditions without producing a false trigger signal. There is a problem, however, when trying to detect an object, such as a person. If signals from the two transducers are equal and opposite they cancel each other and the detected object does not generate a trigger signal. The result is the same as no detection. The cancellation problem can be corrected by adding a lens, typically a Fresnel lens, in front of the PIR detector. These lenses are thin and easy to mass-produce. The Fresnel lens focuses the IR light rays from one region so that they strike only one of the IR transducers and, since there is no signal cancellation, the resulting signal will be detected by the external circuitry. In addition, as the Fresnel lens is typically much larger than the IR transducer, the energy focused on the IR transducer is substantially increased, resulting in greatly increased sensitivity and subsequently, increased range. In operation, a warm object moving from right to left in front of the Fresnel lens will first cause IR light rays to fall on one of the IR transducers. As the warm object continues to move, there would be a brief period when neither IR transducer receives any IR radiation. Finally, as the warm object continues moving to the left, IR light rays will fall on the other of the two IR transducers. The external circuitry receives a positive pulse followed by a negative pulse as an indication that there is motion in front of the sensor. Motion sensors using this principle are available with ranges up to 100 feet or even more and are the choice for detecting motion in the shaded region 18 shown in FIGS. 2 and 3.

As mentioned, trying to use this sensor to detect motion in the region designated 19 results in several problems. The first problem is that the focal length of the lens used to prevent signal cancellation and increase sensitivity requires that the lens be placed relatively far from the PIR detector in order to properly focus the IR energy on the IR transducers. The size of the motion sensor has to be significantly enlarged in order to mount an additional Fresnel lens to the bottom of the sensor. This creates cost and aesthetic issues. A second problem is that at close range the signal canceling problem begins to re-occur. The regions that focus IR energy to the two IR transducers gradually diverge as the distance from the sensor is increased. At close range, however, the two detection regions for the two transducers are very close together. A typical installation has the motion sensor mounted about seven feet above the ground. The head of an adult walking below the sensor would be within a foot or a foot and a half of the motion sensor. At this distance the detection regions of the two transducers are less than one inch apart. An object the size of a human being will tend to be in both transducers' detection zones at the same time and the signals generated will cancel each other out. It should be noted that a Fresnel lens may be used in a situation where longer range is needed, and a larger size is not an issue.

A third problem is that at close range the covered regions are only a very small portion of the volume below the sensor head. This problem can be addressed by using a multi-faceted Fresnel lens, but the design will be more complicated and expensive and there will still be large portions of the volume or region below the sensor head that are not in either of the detection zones of the two transducers.

Figure 16:
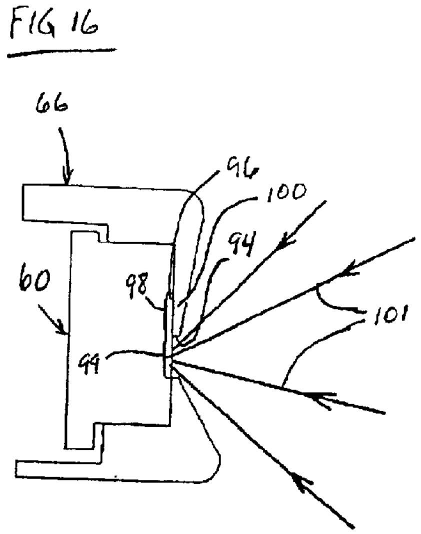
FIG. 16 is a section view of the sensor mounted in the weather shield.

Referring to FIG. 16, there is shown the use of the dual transducer PIR detector 60 with a blocking wall or portion 100 integral with the shield 66 which prevents IR radiation or light rays 101 from reaching the first IR transducer 98. Blocking one transducer eliminates the signal canceling effect, even for objects that are very close to the motion sensor. IR light rays 101 from many angles can, however, reach the second IR transducer 99 through the window 96 since there is no Fresnel lens to focus the light rays. The result is a very broad volume or region below the sensor in which motion can be detected. Without the use of a Fresnel lens, sensitivity is greatly reduced, but at short range the amount of IR radiation reaching the transducer is still adequate for reliable motion detection. Further, there is a direct cost benefit by not having to use a Fresnel lens. Additionally, weather effects can still affect both transducers equally since there is not a complete seal separating the sensor element from the surrounding air. This arrangement does not affect the sensor's ability to cancel "false" signals from weather related events.

The cup section 70 of the shield receives the sensor 60 and acts as a weather shield to prevent air currents from causing unwanted false activation. Further, the cup portion 70 provides an air space 102, FIG. 14, between the sensor window 96 behind the opening 94 and the nose portion 92 which adjoins the cover 68. This ensures that rapid ambient temperature changes are not transmitted to the transducer through or around the cover 68.

The weather shield may be made of any suitable material, such as polyvinyl chloride thereby enabling its structure to be molded as one integral piece. It can now be appreciated that the first pair of openings 76, 78 align with the sleeves 52, 54, FIG. 6 and are engaged by the screws 80, 82. The second pair of openings 84, 86 align with a pair of openings 102, 103, FIG. 9 formed in the printed circuit board 64 and the screws 88, 90 are received by the openings 84, 86 and the openings 102, 103.

Figure 17:
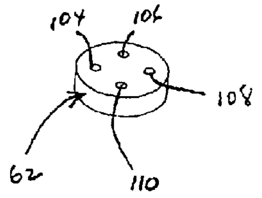
FIG. 17 is an isometric view of the spacer.

Referring now to FIG. 17, the spacer 62 is shown in more detail. The spacer is disk shaped and includes four openings 104, 106, 108, 110 to allow electrical leads from the sensor 60 to pass through the spacer and attach to the circuit of the PC board 64. The spacer may be made of any suitable material, such as polyvinyl chloride or ABS and may also be formed in a single molding operation or as an extrusion.

Referring now to FIGS. 18–21, the cover 68 is shown in more detail. The cover has a generally dish shaped form with an upper annular periphery 112 and a base 114. The cover is constructed to receive the nose portion 92 of the weather shield 66. The base of the cover extends through the opening 50, FIG. 5 of the housing and protects the exposed sensor window 96 from the ambient environment surrounding the housing. A lower surface 116 of the base 114 aligns flush with an outer surface 118, FIG. 7 of the bottom wall 24 of the housing 20. The periphery 112 acts as a flange to limit movement of the cover through the opening 50. Further, both the nose portion 92 of the shield and the base of the cover are slightly oblique to conform with the slanted bottom wall of the housing. The cover may be made of clear polyethylene. As explained, a clear cover is all that is required for the look down sensor. There is no need for a Fresnel lens.

In assembly, the sensor 60 and the spacer 62 are inserted into the cup section 70 of the mounting shield 66. Using the pair of fasteners 88, 90, the shield may then be connected to the PC board 64 thereby securing the sensor and the spacer. Thereafter, the nose portion 92 of the mounting element is placed into the cover 68 so as to adjoin the base 114. Because both the base 114 of the cover and the nose portion 92 of the shield are formed at a slight oblique, about 5 degrees from a horizontal, the cover aligns with the bottom wall 24 of the housing. The "package" including the PC board, the spacer, the sensor, the shield and the cover may then be fastened to the housing by the pair of screws 80, 82 so as to conform to the arrangement shown in FIG. 8. A key 120, FIG. 9, on the outer surface of the sensor is used to align the sensor with a slot 122, FIG. 10 in the inner wall of the cup section. Another slot 124, FIG. 16, in the periphery 112 of the cover may be used to align the cover. By placing the sensor in the shield, the sensor is shielded from weather effects such as rapid temperature changes and moisture, for example. Thus, a reliable and simple system is achieved which is inexpensive to make and assemble.

The remainder of the components may then be assembled in the housing in the usual manner well known by those skilled in the art.

The portion of the specification above describes in detail a preferred embodiment of the present invention. Other examples, embodiments, modifications and variations will under both the literal language of the following claims and the doctrine of equivalents come within the scope of the invention as defined by those appended claims. For example, the housing may be a simple mounting structure for just a single two transducer sensor 60 which is aimed in a generally horizontal direction or line of sight. With no Fresnel lens such a motion sensing system may be used for a room light switch where the range requirement is minimal. Thus, a person walking through a door way with a closely spaced sensor having one of two transducers blocked or covered will cause a signal to be generated to activate a light or an alarm, for example. This is considered within the scope of the claims. Also, adding more sensors or using less sensors than shown in the FIGS. 7–9 embodiment is considered to be equivalent structures and will come within the literal language of the claims. So will geometric changes. For example, if the shapes of the spacer and the sensor change, the cup section 70 of the shield may also change. Still other alternatives will also be equivalent as will many new technologies. There is no desire or intention here to limit in any way the application of the doctrine of equivalents nor to limit or restrict the scope of the invention.

What is claimed is:

1. A motion sensing system having a downward looking capability comprising:

a housing having an opening that allows viewing in a downward direction when said housing is mounted for use;

a sensor positioned in said housing; and a shield for mounting said sensor and for shielding said sensor from weather;

said sensor having a first and a second transducer, said shield including a blocking wall covering said second transducer.

2. An apparatus as claimed in claim 1 wherein:

said shield includes a first attachment element for connecting said shield to said housing.

3. An apparatus as claimed in claim 2 wherein:

said first attachment element for connecting said shield to said housing includes a pair of openings.

4. An apparatus as claimed in claim 3 wherein:

said first attachment element for connecting said shield to said housing includes a pair of opposing ears, each of said ears having one of said pair of openings.

5. An apparatus as claimed in claim 1 including:

a printed circuit board operatively connected to said sensor.

6. An apparatus as claimed in claim 5 wherein:

said shield includes a first attachment element for connecting said shield to said housing and a second attachment element for connecting said printed circuit board to said shield.

7. An apparatus as claimed in claim 6 wherein:

said first attachment element includes a first pair of openings adapted to receive a first pair of fasteners, and said second attachment element includes a second pair of openings adapted to receive a second pair of fasteners.

8. An apparatus as claimed in claim 7 wherein:

said first pair of openings is disposed generally perpendicular to said second pair of openings.

9. An apparatus as claimed in claim 1 wherein:

said housing includes an attachment element for mounting said shield.

10. An apparatus as claimed in claim 9 wherein:

said shield includes a first attachment element for connecting said shield to said attachment element of said housing and a second attachment element for connecting a printed circuit board to said shield.

11. An apparatus as claimed in claim 10 wherein:

said first attachment element includes a first pair of openings adapted to receive a first pair of fasteners, and said second attachment element includes a second pair of opening adapted to receive a second pair of fasteners, said first pair of fasteners also being adapted to be received by said attachment elements of said housing.

12. An apparatus as claimed in claim 1 including:

a spacer disposed adjacent said sensor.

13. An apparatus as claimed in claim 12 including:

a printed circuit board connected to said sensor; and wherein said spacer is disposed between said sensor and said printed circuit board.

14. An apparatus as claimed in claim 13 including:

a cover for separating the ambient environment outside of said housing from said sensor, and wherein:

said housing includes an attachment element for mounting said shield;

said shield includes first attachment element for connecting said shield to said attachment element of said housing and a second attachment element for connecting said printed circuit board to said shield; and said first attachment element includes a pair of openings adapted to receive a first pair of fasteners and said second attachment element includes a second pair of openings adapted to receive a second pair of fasteners, said first pair of fasteners also being received by said attachment element of said housing.

15. An apparatus as claimed in claim 14 including:

a first pair of fasteners for connecting said shield to said housing; and a second pair of fasteners for connecting said printed circuit board and said shield.

16. An apparatus as claimed in claim 1 including:

a cover for separating the ambient environment outside of said housing from said sensor.

17. An apparatus as claimed in claim 1 wherein:

said shield includes a cup shaped portion for surrounding the sensor.

18. An apparatus as claimed in claim 17 wherein:

said blocking wall is connected to said shield;

said housing includes an attachment element for mounting said shield;

said shield includes an attachment element for connecting said shield to said attachment element of said housing; and said attachment element of said shield includes a pair of openings adapted to receive a pair of fasteners, said pair of fasteners also being received by said attachment element of said housing.

19. An apparatus as claimed in claim 1 wherein:

said shield also includes a cup shape portion for surrounding the sensor and providing protection from weather effects.

20. A motion sensing system comprising:

a mounting;

a passive infrared sensor having two transducers of opposite electrical polarity in side by side relationship supported by said mounting; and a blocking element disposed to cover one of said two transducers wherein the uncovered transducer receives infrared energy in the absence of a Fresnel lens and the covered transducer still receives infrared energy from weather effects to cause a cancellation of a weather effects signal generated by said uncovered transducer.

21. A motion sensing system having a downward looking capability comprising:

a housing having an opening that allows viewing in a downward direction when said housing is mounted for use;

a sensor positioned in said housing; and a shield for mounting said sensor and for shielding said sensor from weather;

said sensor having a first and a second transducer, said shield including a blocking wall covering said second transducer;

said shield includes a first attachment element for connecting said shield to said housing;

said first attachment element for connecting said shield to said housing includes a pair of openings;

said first attachment element for connecting said shield to said housing includes a pair of opposing ears, each of said ears having one of said pair of openings.

22. A motion sensing system having a downward looking capability comprising:

a housing having an opening that allows viewing in a downward direction when said housing is mounted for use;

a sensor positioned in said housing; and a shield for mounting said sensor and for shielding said sensor from weather;

said sensor having a first and a second transducer, said shield including a blocking wall covering said second transducer;

said shield includes a first attachment element for connecting said shield to said housing;

said first attachment element for connecting said shield to said housing includes a pair of openings;

said first attachment element for connecting said shield to said housing includes a pair of opposing ears, each of said ears having one of said pair of openings;

a printed circuit board operatively connected to said sensor;

said shield includes a first attachment element for connecting said shield to said housing and a second attachment element for connecting said printed circuit board to said shield;

said first attachment element includes a first pair of openings adapted to receive a first pair of fasteners, and said second attachment element includes a second pair of openings adapted to receive a second pair of fasteners;

said first pair of openings is disposed generally perpendicular to said second pair of openings.

* * * * *

UNITED STATES PATENT AND TRADEMARK OFFICE

CERTIFICATE OF CORRECTION

PATENT NO. : 6,747,275 B2

DATED : June 8, 2004

INVENTOR(S) : William Raper, Kim McCavit and Yiu Tsui

It is certified that error appears in the above-identified patent and that said Letters Patent is hereby corrected as shown below:

Column 2

Line 7, “drawing” should be -- drawings --.

Line 56, delete “A”.

Line 60, “drawing” should be -- drawings --.

Column 4,

Line 49, “86” should be -- 85 --.

Column 6,

Line 37 and 39, “86” should be -- 85 --.

Figure 18:
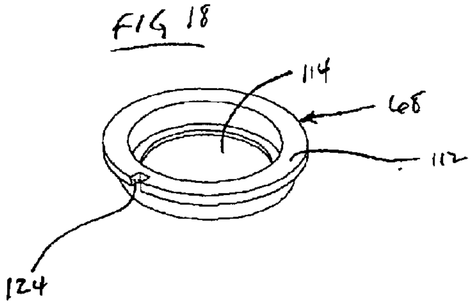
FIG. 18 is an isometric view of a cover.
Figure 19:
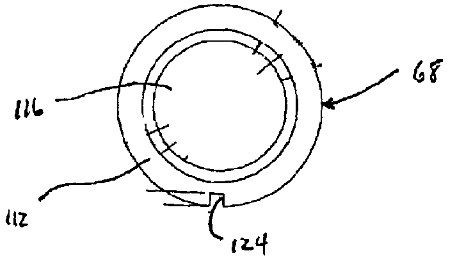
FIG. 19 is a top plan view of the cover.
Figure 20:
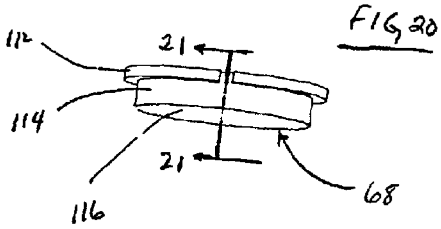
FIG. 20 is an elevation view of the cover.
Figure 21:
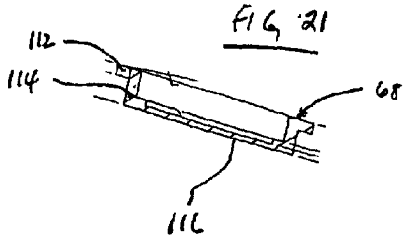
FIG. 21 is a section view taken along line 21—21 of FIG. 20.

Column 7,

Line 13, “FIG. 16” should be -- FIG. 18 --.

Column 8,

Line 31, “opening” should be -- openings --.

Signed and Sealed this

Sixth Day of June, 2006

JON W. DUDAS

*Director of the United States Patent and Trademark Office*